(12) United States Patent
Chen et al.

(10) Patent No.: US 7,388,624 B2
(45) Date of Patent: Jun. 17, 2008

(54) REFLECTIVE TYPE LIQUID CRYSTAL PANEL AND PIXEL STRUCTURE THEREOF

(75) Inventors: Wei-Hsiao Chen, Tainan County (TW); Hon-Yuan Leo, Tainan County (TW); Cheng-Chi Yen, Tainan County (TW); Yao-Jen Tsai, Tainan County (TW)

(73) Assignee: Himax Display, Inc., Tainan County (TW)

( * ) Notice: Subject to any disclaimer, the term of this patent is extended or adjusted under 35 U.S.C. 154(b) by 276 days.

(21) Appl. No.: 11/164,024

(22) Filed: Nov. 8, 2005

(65) Prior Publication Data

US 2007/0103621 A1 May 10, 2007

(51) Int. Cl.
*G02F 1/1335* (2006.01)
*G02F 1/1333* (2006.01)
(52) U.S. Cl. .................. 349/44; 349/38; 349/111; 349/113
(58) Field of Classification Search .............. 349/33, 349/38, 39, 44, 110, 113, 111

See application file for complete search history.

(56) References Cited

U.S. PATENT DOCUMENTS

2005/0146649 A1* 7/2005 Sato ........................... 349/44

\* cited by examiner

*Primary Examiner*—Frank G Font
*Assistant Examiner*—Michael P Mooney
(74) *Attorney, Agent, or Firm*—Jianq Chyun IP Office

(57) ABSTRACT

A reflective type liquid crystal panel including a substrate, an array of transistors, capacitors, metal patterns, conductive walls, reflective pixel electrodes, an opposite substrate, and a liquid crystal layer is provided. The transistors and the capacitors are disposed on the substrate, and the capacitors are surrounding drain terminals of the corresponding transistors respectively. The metal patterns cover the corresponding transistors and overlap the corresponding capacitors respectively, and the metal patterns are electrically connected to the corresponding drain terminals respectively. The conductive walls surround the corresponding transistors and are connected between the corresponding metal patterns and the corresponding capacitors respectively. The reflective pixel electrodes are disposed over the corresponding metal patterns and electrically connected to the corresponding drain terminals respectively. The opposite substrate has a transparent electrode layer thereon, and the liquid crystal layer is disposed between the transparent electrode layer and the reflective pixel electrodes.

16 Claims, 5 Drawing Sheets

REFLECTIVE TYPE LIQUID CRYSTAL PANEL AND PIXEL STRUCTURE THEREOF

BACKGROUND OF THE INVENTION

1. Field of the Invention

The present invention generally relates to a display device. More particularly, the present invention relates to a reflective type liquid crystal panel.

2. Description of Related Art

The liquid crystal on silicon (LCOS) panel is in fact a silicon wafer back panel, by using MOS transistors in place of the thin film transistors used in the conventional liquid crystal panels. Generally, the LCOS panel has two basic types: transmissive and reflective. Nevertheless, the most research and development work is centered on the reflective type LCOS panel. The pixel electrodes of the reflective type LCOS panel are made of metal materials. Moreover, because the metal pixel electrodes mostly cover the pixel regions, especially the MOS transistors, the LCOS panel is superior in image display compared with conventional liquid crystal panels.

FIG. 1 schematically illustrates a circuit layout of a pixel in a conventional reflective type LCOS panel. As shown in FIG. 1, the storage capacitor 120 and the LC capacitor 130 can be charged to a voltage by controlling the MOS transistor 110, and the liquid crystal molecules in the LC capacitor 130 are aligned along a specific direction according to the voltage. Furthermore, the storage capacitor 120 is used for maintaining the voltage of the LC capacitor 130 during a frame time for superior displaying uniformity. Because the MOS transistor 110 is made from semiconductor material, leakage currents induced by light entering the LCOS panel, especially the one occurring at the drain terminal 116 of the MOS transistor 110, may lead to a descent in the voltage of the storage capacitor 120, and the displaying uniformity of the LCOS panel goes inferior.

Accordingly, LCOS panels coming with light shielding function are brought out. FIG. 2 shows a schematic cross-sectional view of a conventional reflective type LCOS panel fabricated from a typical 1P3M (single polysilicon layer and three metal layers) wafer process. As shown in FIG. 2, the LCOS panel 200 comprises a silicon substrate 210, a liquid crystal layer 220, and a glass substrate 230. MOS transistors 212 corresponding to different pixel regions 202 are fabricated in the silicon substrate 210 respectively. Reflective pixel electrodes 250 are provided in their corresponding pixel regions 202 with light transmissive regions 252 being located between the reflective pixel electrodes 250. A routing metal layer 214 to form mutually-orthogonal row and column lines (not shown in FIG. 2), which may be electrically connected to the gate, source and drain terminals (not shown in FIG. 2) of the MOS transistors 212, is formed above the silicon substrate 210. In addition, a light shielding metal layer 216 is provided beneath the light transmissive regions 252 between the reflective pixel electrodes 250 and the routing metal layer 214 to prevent light entering the LCOS panel 200 through the transmissive regions 252 from reaching the silicon substrate 210.

However, it is noted that a separated light shielding metal layer 216 is required for the reflective pixel electrodes 250 to be electrically connected with the routing metal layer 214. Thus, the light entering the LCOS panel 200 through the separated light shielding metal layer 216 may still reach the silicon substrate 210, and the induced leakage current can not be exactly eliminated. Furthermore, high pattern density of the light shielding metal layer 216 may lead to unexpected mechanism effects such as stress concentration or poor wafer flatness.

SUMMARY OF THE INVENTION

Accordingly, an object of the present invention is to provide a reflective type liquid crystal panel and a pixel structure thereof coming with more efficient light shielding ability and having superior reliability.

The present invention provides a pixel structure of a reflective type liquid crystal panel, wherein the pixel structure comprises a transistor, a capacitor, a metal pattern, a conductive wall and a reflective pixel electrode. The transistor and the capacitor are disposed on the substrate, and the capacitor surrounds a drain terminal of the transistor. The metal pattern covers the transistor and overlaps the capacitor, and the metal pattern is electrically connected to the drain terminal. The conductive wall surrounds the transistor and is connected between the metal pattern and the capacitor. The reflective pixel electrode is disposed over the metal pattern and electrically connected to the drain terminal.

The present invention further provides a reflective type liquid crystal panel comprising a substrate, an array of transistors, a plurality of capacitors, a plurality of metal patterns, a plurality of conductive walls, a plurality of reflective pixel electrodes, an opposite substrate, and a liquid crystal layer. The transistors and the capacitors are disposed on the substrate, and the capacitors are surrounding drain terminals of the corresponding transistors respectively. The metal patterns cover the corresponding transistors and overlap the corresponding capacitors respectively, and the metal patterns are electrically connected to the corresponding drain terminals respectively. The conductive walls surround the corresponding transistors and are connected between the corresponding metal patterns and the corresponding capacitors respectively. The reflective pixel electrodes are disposed over the corresponding metal patterns and electrically connected to the corresponding drain terminals respectively. The opposite substrate has a transparent electrode layer thereon, and the liquid crystal layer is disposed between the transparent electrode layer and the reflective pixel electrodes.

According to an embodiment of the present invention, a routing metal layer is provided for forming the aforementioned metal patterns.

According to an embodiment of the present invention, the aforementioned transistor is a metal oxide semiconductor (MOS) transistor. A diffusion layer is provided for forming an electrode of each capacitor and a source terminal and the drain terminal of each transistor. Furthermore, a polysilicon layer over the diffusion layer is provided for forming a gate terminal of each transistor and another electrode of each capacitor.

According to an embodiment of the present invention, a mirror metal layer is provided for forming the aforementioned reflective pixel electrodes.

According to an embodiment of the present invention, the pixel structure or the reflective type liquid crystal panel mentioned above may further comprise a light shielding metal layer, which is disposed between the metal pattern and the reflective pixel electrode.

According to an embodiment of the present invention, the conductive walls are in U-shape.

Since the metal pattern, the conductive wall and the capacitor are arranged around the drain terminal of the transistor to block the light entering the reflective type liquid crystal panel, the induced leakage current can be effectively eliminated and the reliability of the reflective type liquid crystal panel is promoted.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
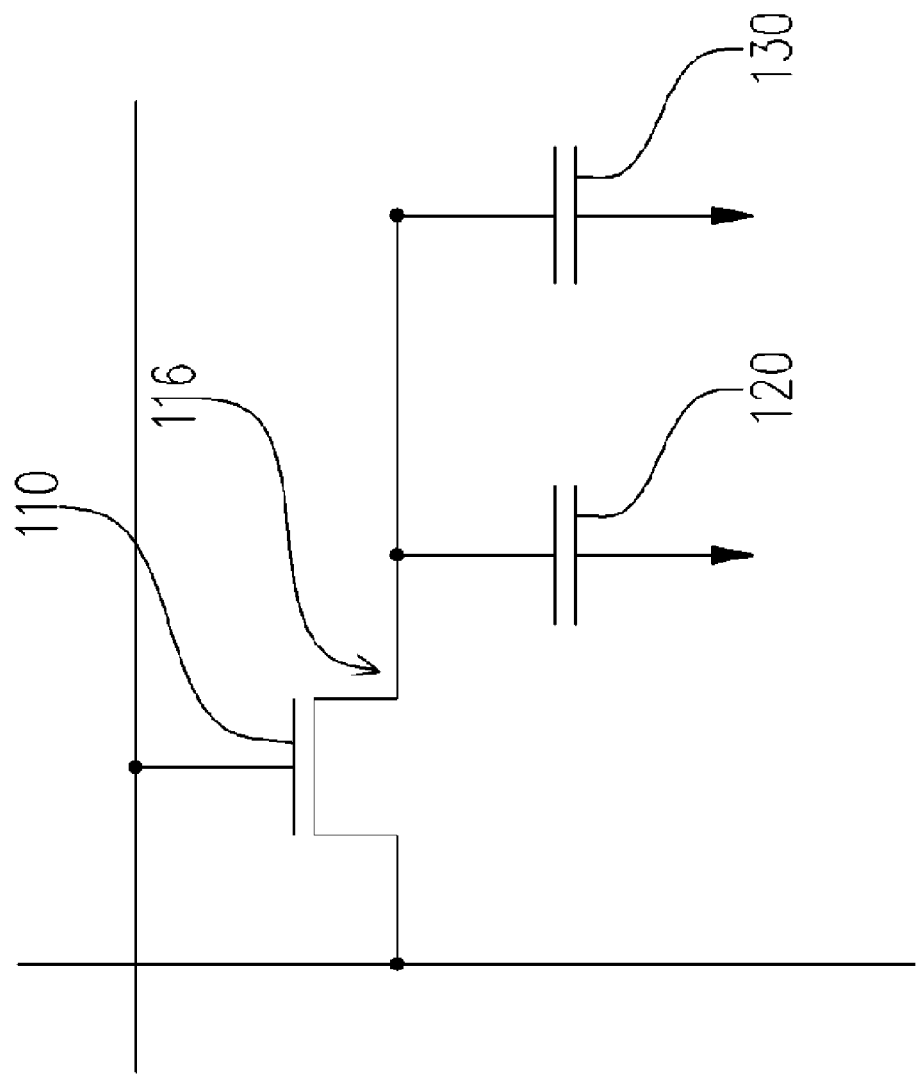
FIG. 1 schematically illustrates a circuit layout of a pixel in a conventional reflective type LCOS panel.
Figure 2:
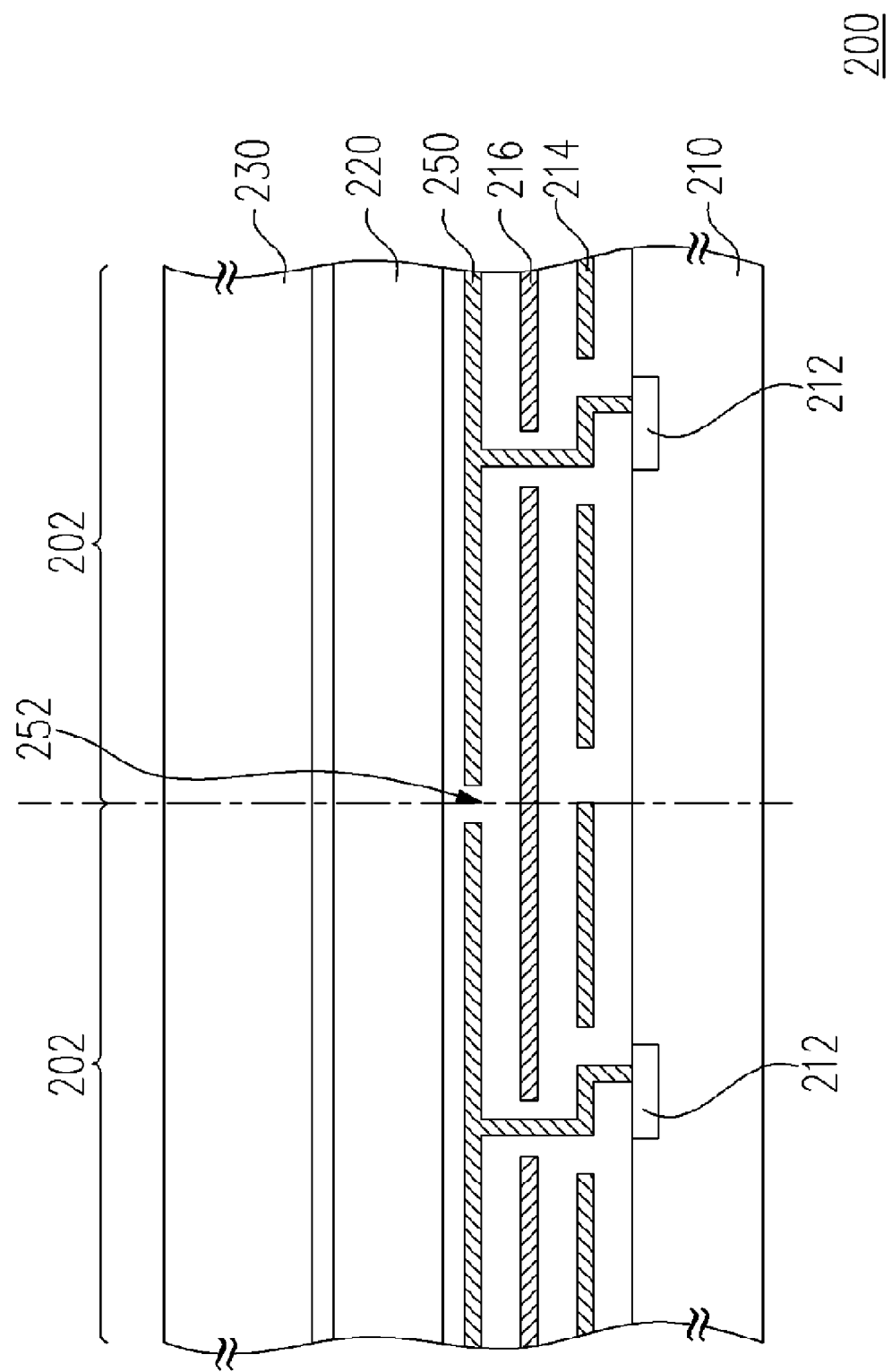
FIG. 2 shows a schematic cross-sectional view of a conventional reflective type LCOS panel.

Reference will now be made in detail to the present preferred embodiments of the invention, examples of which are illustrated in the accompanying drawings. Wherever possible, the same reference numbers are used in the drawings and the description to refer to the same or like parts.

The present invention provides a reflective type liquid crystal panel and a pixel structure thereof, which have superior light shielding ability, by amending the layout design of the pixel structure. In particular, although the reflective type liquid crystal panel in the following embodiment is assumed to be an LCOS panel fabricated by an 1P3M (single polysilicon layer and three metal layers) wafer process and the transistor thereof is assumed to be a MOS transistor, other applicable wafer process and various types of transistor can also be adopted according to the spirit of the present invention.

Figure 3:
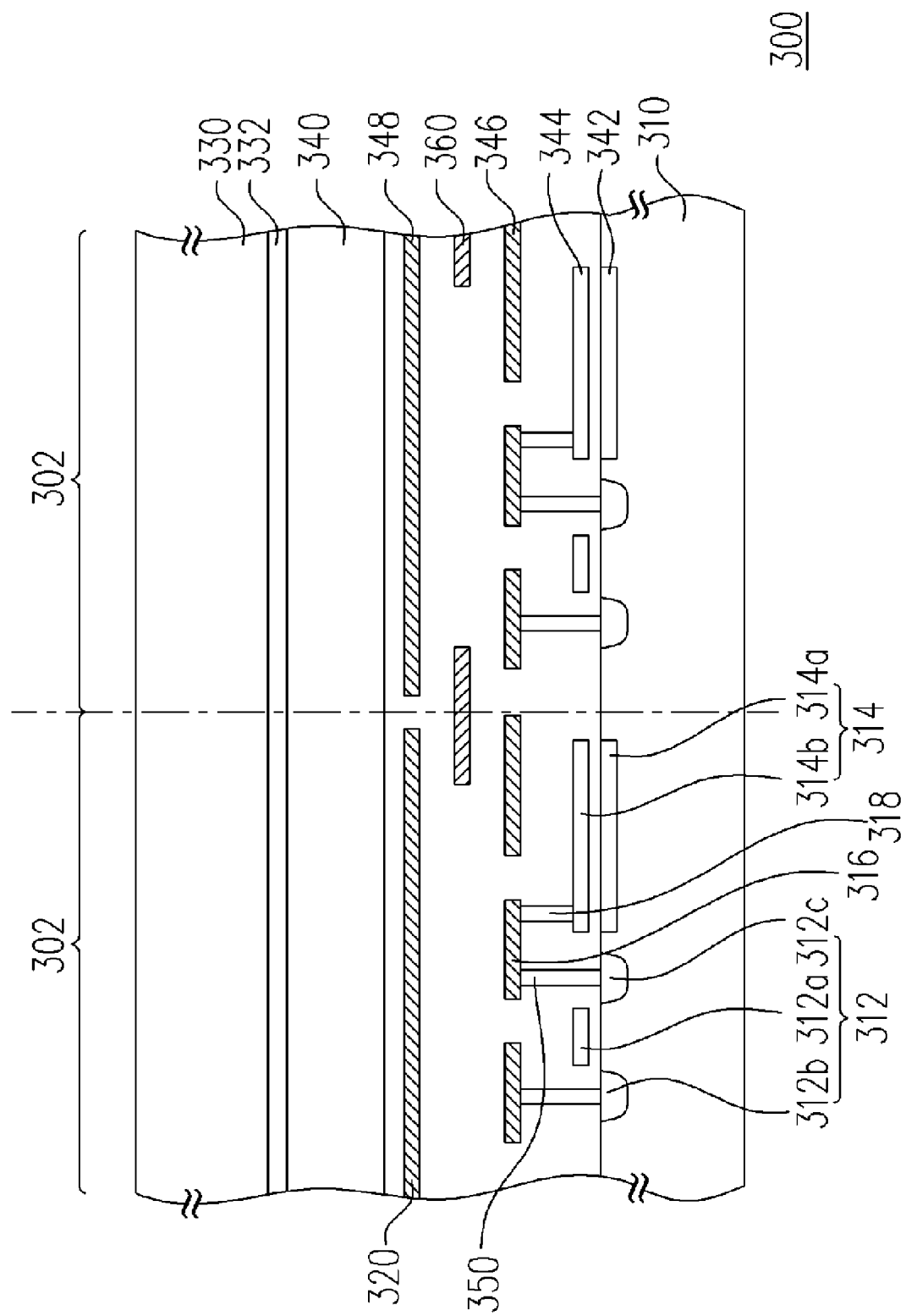
FIG. 3 is a partial cross-sectional view illustrating a reflective type liquid crystal panel according to an embodiment of the present invention.
Figure 4A:
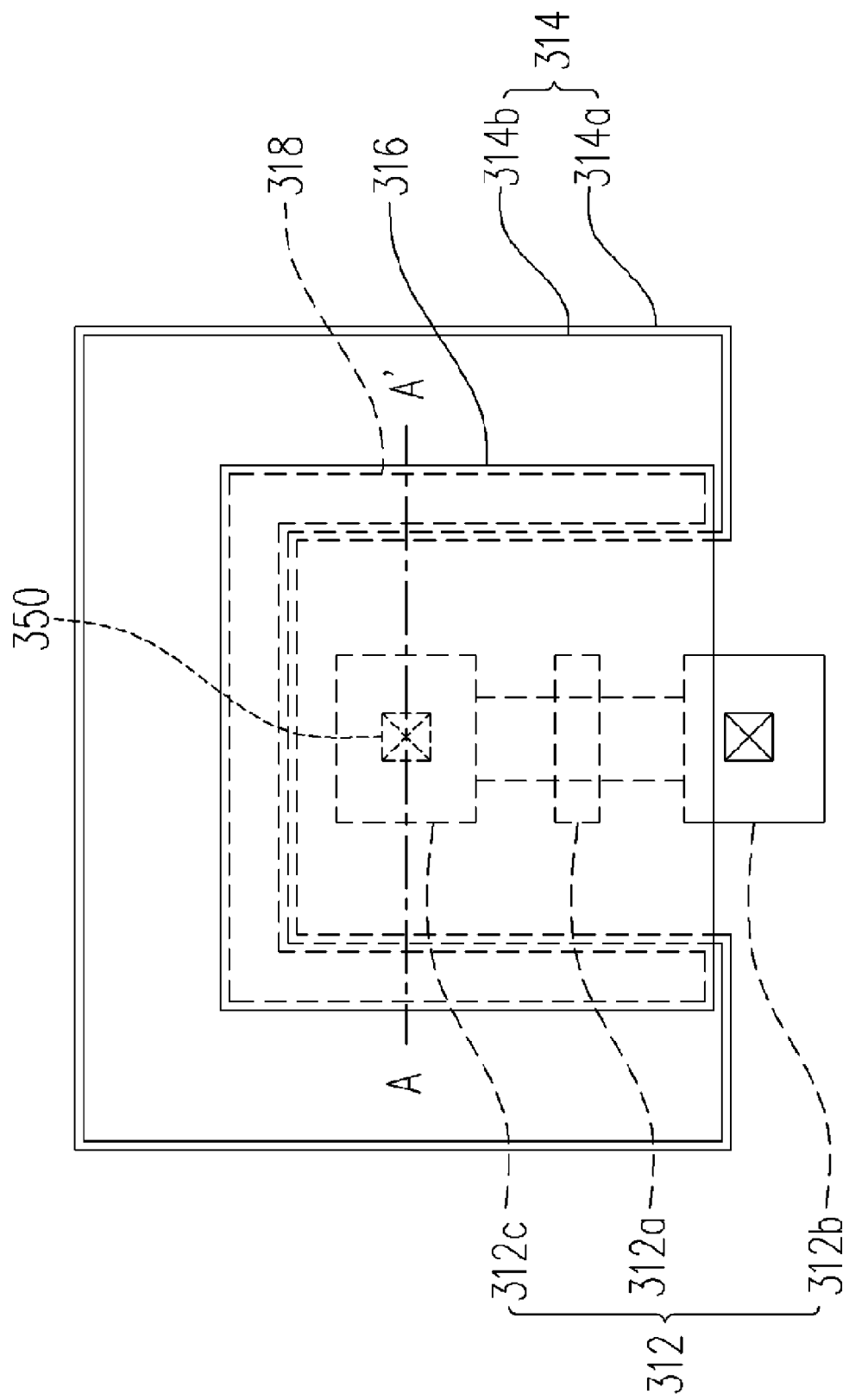
FIG. 4A shows a top view of a pixel structure of the reflective type liquid crystal panel according to the aforementioned embodiment as shown in FIG. 3.
Figure 4B:
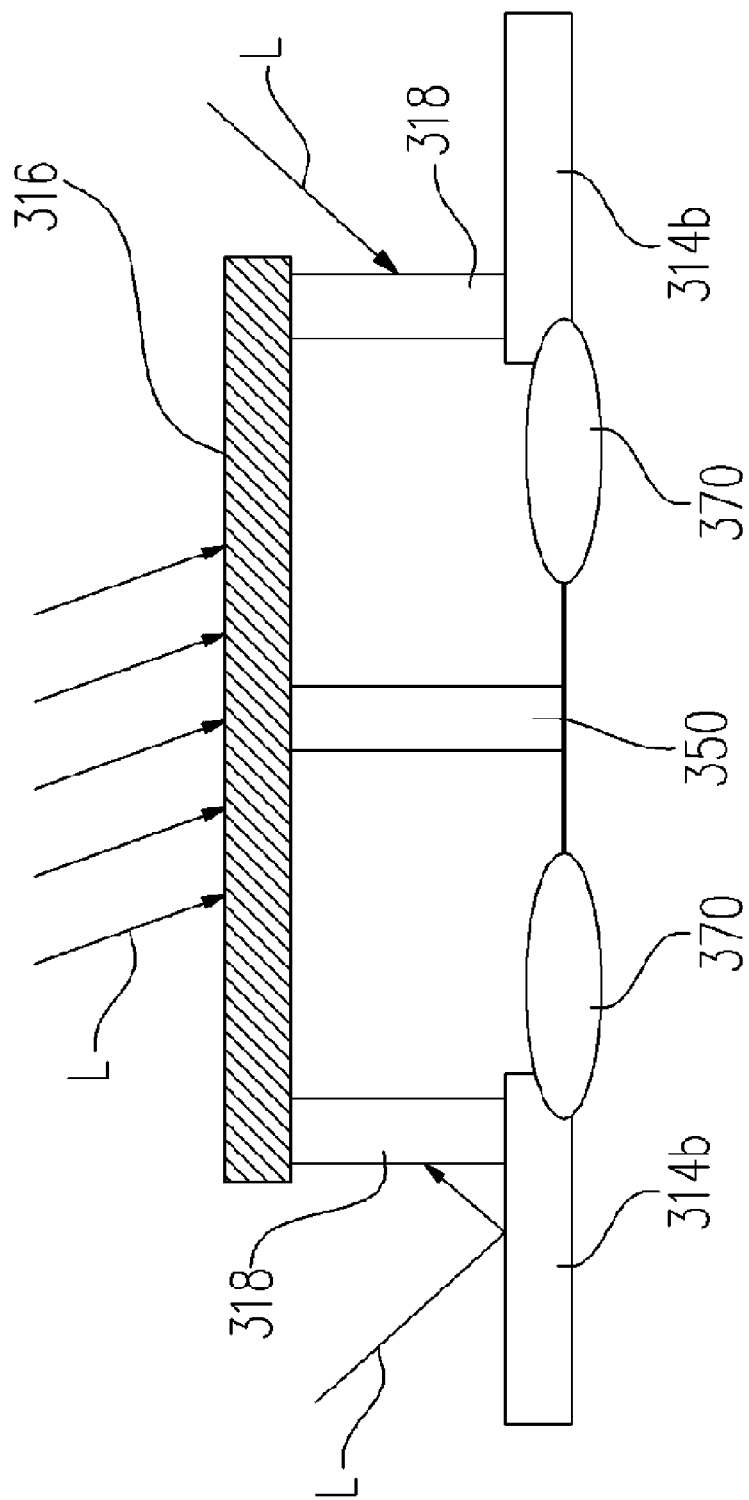
FIG. 4B is a cross-sectional view along line A-A' in FIG. 4A.

FIG. 3 is a partial cross-sectional view illustrating a reflective type liquid crystal panel according to an embodiment of the present invention. It is noted that the reflective type liquid crystal panel may comprises a plurality of pixel structures, but in order to simplify the drawing, only a part of pixel structures is shown in FIG. 3. FIG. 4A shows a top view of a pixel structure of the reflective type liquid crystal panel as shown in FIG. 3. FIG. 4B is a cross-sectional view along line A-A' in FIG. 4A. To simplify the drawing and the explanation, only some layers of the pixel structure are shown in FIGS. 4A and 4B.

As shown in FIG. 3, the reflective type liquid crystal panel 300 having a plurality of pixel regions 302 comprises a substrate 310, an array of transistors 312, a plurality of capacitors 314, a plurality of metal patterns 316, a plurality of conductive walls 318, a plurality of reflective pixel electrodes 320, an opposite substrate 330, and a liquid crystal layer 340. The substrate 310 may be a silicon substrate, and the transistors 312 are fabricated on the substrate 310. The opposite substrate 330 has a transparent electrode layer 332 thereon, and the liquid crystal layer 340 is disposed between the substrate 310 and the opposite substrate 330. In an embodiment, the material of the transparent electrode layer 332 may be indium tin oxide (ITO).

The transistors 312 are MOS transistors, which disposed in the corresponding pixel regions 302 respectively. The capacitors 314 are disposed on the substrate 310 and surrounding drain terminals 312c of the corresponding transistors 312 respectively. In the embodiment, the source terminals 312b and the drain terminals 312c of the transistors 312 and electrodes 314a of the capacitors 314 are formed from a diffusion layer 342, in which dopants are doped by performing diffusion technique. In addition, the gate terminals 312a of the transistors 312 and the other electrodes 314b of the capacitors 314 may be formed from a polysilicon layer 344 above the diffusion layer 342.

The metal patterns 316 are disposed over the corresponding transistors 312. Each metal pattern 316 overlaps the corresponding capacitor 314 and is electrically connected to the drain terminal 312c of the transistor 312 via a contact hole 350. Specifically, the metal patterns 316 are formed from a routing metal layer 346, which also forms mutually-orthogonal row and column lines (not shown in FIG. 3) electrically connected to the gate terminals 312a, source terminals 312b and drain terminals 312c of the transistors 312.

Each conductive wall 318 surrounds the corresponding transistor 312 and connected between the corresponding metal pattern 316 and the electrode 314b of the corresponding capacitor 314. In addition, the reflective pixel electrodes 320 are disposed beneath the liquid crystal layer 340 and electrically connected to the corresponding drain terminals 312c of the transistors 312 respectively. The reflective pixel electrodes 320 may be formed from a mirror metal layer 348. It should be noted that in order to enhance the light shielding effect, a light shielding metal layer 360 can further be provided to specific positions between the metal patterns 316 and the reflective pixel electrodes 320.

Referring to FIGS. 4A and 4B, the drain terminal 312c is surrounded by the conductive wall 318, the electrode 314b of the capacitor 314, and the field oxide region 370. Moreover, the metal pattern 316 covers the drain terminal 312c and connects the conductive wall 318. Thus, the light L entering the reflective type liquid crystal panel is nearly blocked by the metal pattern 316 and the conductive wall 318 surrounding the drain terminal 312c.

Therefore, by the means of the present invention, the drain terminal of the transistor can be protected from the entering light, and the induced leakage current can be effectively eliminated for superior displaying uniformity. Furthermore, while the light shielding layer can still be provided to enhance the light shielding effect in the invention, the pattern density thereof will be reduced to an applicable range to prevent stress concentration and improve wafer flatness. Then, the reliability of the reflective type liquid crystal panel is promoted.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure of a reflective type liquid crystal panel, the pixel structure comprising:
    a transistor disposed on a substrate;
    a capacitor disposed on the substrate and surrounding a drain terminal of the transistor;
    a metal pattern covering the transistor and overlapping the capacitor, the metal pattern being electrically connected to the drain terminal, wherein a routing metal layer is provided for forming the metal pattern;

a conductive wall surrounding the transistor and connected between the metal pattern and the capacitor; and a reflective pixel electrode disposed over the metal pattern and electrically connected to the drain terminal.

2. The pixel structure according to claim 1, wherein the transistor is a metal oxide semiconductor (MOS) transistor.

3. The pixel structure according to claim 2, wherein a diffusion layer is provided for forming an electrode of the capacitor and a source terminal and the drain terminal of the transistor.

4. The pixel structure according to claim 3, wherein a polysilicon layer over the diffusion layer is provided for forming a gate terminal of the transistor and another electrode of the capacitor.

5. The pixel structure according to claim 1, wherein a mirror metal layer is provided for forming the reflective pixel electrode.

6. The pixel structure according to claim 1, further comprising a light shielding metal layer disposed between the metal pattern and the reflective pixel electrode.

7. The pixel structure according to claim 1, wherein the conductive wall is in U-shape.

8. A reflective type liquid crystal panel, comprising:

a substrate;

an array of transistors disposed on the substrate;

a plurality of capacitors disposed on the substrate and surrounding drain terminals of the corresponding transistors respectively;

a plurality of metal patterns covering the corresponding transistors and overlapping the corresponding capacitors respectively, the metal patterns being electrically connected to the corresponding drain terminals respectively, wherein a routing metal layer is provided for forming the metal patterns;

a plurality of conductive walls surrounding the corresponding transistors and connected between the corresponding metal patterns and the corresponding capacitors respectively;

a plurality of reflective pixel electrodes disposed over the corresponding metal patterns and electrically connected to the corresponding drain terminals respectively;

an opposite substrate with a transparent electrode layer thereon; and a liquid crystal layer disposed between the transparent electrode layer and the reflective pixel electrodes.

9. The reflective type liquid crystal panel according to claim 8, wherein the transistors are metal oxide semiconductor (MOS) transistors.

10. The reflective type liquid crystal panel according to claim 9, wherein a diffusion layer is provided for forming an electrode of each capacitor and a source terminal and the drain terminal of each transistor.

11. The reflective type liquid crystal panel according to claim 10, wherein a polysilicon layer over the diffusion layer is provided for forming a gate terminal of each transistor and another electrode of each capacitor.

12. The reflective type liquid crystal panel according to claim 8, wherein a mirror metal layer is provided for forming the reflective pixel electrodes.

13. The reflective type liquid crystal panel according to claim 8, further comprising a light shielding metal layer disposed between the metal patterns and the reflective pixel electrodes.

14. The reflective type liquid crystal panel according to claim 8, wherein the conductive walls are in U-shape.

15. The reflective type liquid crystal panel according to claim 8, wherein the substrate is a silicon substrate.

16. The reflective type liquid crystal panel according to claim 8, wherein the opposite substrate is a glass substrate.

* * * * *